United States Patent [19]

Liu

[11] Patent Number: 4,711,459
[45] Date of Patent: Dec. 8, 1987

[54] QUICK-RELEASE HUB RETENTION DEVICE

[76] Inventor: King Liu, No. 19, Shun Fan Road, Ta Chia Town, Taichung Hsien, Taiwan

[21] Appl. No.: 946,779

[22] Filed: Dec. 29, 1986

[51] Int. Cl.⁴ ............................................. B62K 25/02
[52] U.S. Cl. ................................................... 280/279
[58] Field of Search .................... 280/279, 281 R, 287, 280/288, 289 R, 276, 278, 289 L; 301/111, 112, 113, 125; 24/232

[56] References Cited

U.S. PATENT DOCUMENTS

| | | | |
|---|---|---|---|
| 1,387,215 | 8/1921 | Wagner | 280/279 |
| 3,807,761 | 4/1974 | Brilando | 280/279 |
| 4,103,922 | 8/1978 | Brilando | 280/279 |

*Primary Examiner*—John J. Love
*Assistant Examiner*—Everett G. Diederiks, Jr.
*Attorney, Agent, or Firm*—Kirschstein, Kirschstein, Ottinger & Israel

[57] ABSTRACT

A quick-release hub retention device includes a pair of protrusions respectively provided on the outward surface of the lower end portion of each front fork leg, and a pair of rigid clips each pivotally mounted on the axle and having a curved free end for hooking over the protrusion to mount the hub on the front fork. The axle is received in the open-ended slots in lower ends of a bicycle's front fork legs in a known manner. Each clip includes parallel upper and lower portions extending radially of the axle, and a middle portion bridging the upper and lower portions of the clip and extending parallel to the longitudinal axis of the axle. The bridging portions are of a length so that the upper and lower portions respectively abut on the opposite surfaces of the lower end portions of the front fork legs. The clips are incorporated with a main retaining device to prevent accidental separation of the wheel from the fork even if the main retaining device on the axle becomes loose.

5 Claims, 4 Drawing Figures

QUICK-RELEASE HUB RETENTION DEVICE

BACKGROUND OF THE INVENTION

The invention relates generally to bicycles, and more particularly to the mounting device of front wheel quick-release hubs.

A mounting device used for front wheel quick-release hubs is disclosed in U.S. Pat. No. 4,103,922 which incorporates a pair of flexible clips mounted on the axle for manually moving between an inoperative position and an operative position. Each flexible clip includes an aperture or retainer means. Each front fork leg includes a stud or receiver means for inserting through the aperture to prevent accidental separation of wheel from fork even if the regular retaining means on the axle became loose. However, in operation, the alignment of the apertures with the studs for the engagement and disengagement therebetween is troublesome.

SUMMARY OF THE INVENTION

It is therefore an object of the invention to provide an improved safety mounting device for a bicycle quick-release hub which is easy to mount.

According to the invention, the improved safety mounting device for a bicycle quick-release hub having an axle engageable in open-ended slots in the lower ends of the legs of the front fork of the bicycle for receiving the axle, and a quick-release unit including adjustable retainer members movable relative to the axle longitudinally thereof for clampingly retaining the axle in the slots, each of the legs including a protrusion on the outward surface thereof above the slot, the safety mounting comprising a pair of rigid clips, wherein each of the clips comprises: a lower end pivotally mounting on the axle; two parallel upper and lower portions extending radially of the axle, the upper portion being offset from the lower portion and being spaced from the lower portion, the upper portion having a curved free end for hooking over the protrusion to mount the axle on the legs of the front fork; and a middle portion bridging the upper and lower portions and having a length slightly larger than the thickness of the lower end portion of the leg engaged therewith for permitting the parallel upper and lower portion of the clip to respectively abut on opposite sides of the lower end portion of each of the legs to prevent accidental separation of the hub from the front fork despite release of the adjustable retainer members.

BRIEF DESCRIPTION OF THE DRAWINGS

An embodiment of the invention will now be described by way of example, with reference to the accompanying drawings in which.

DETAILED DESCRIPTION OF THE EMBODIMENT

Figure 1:
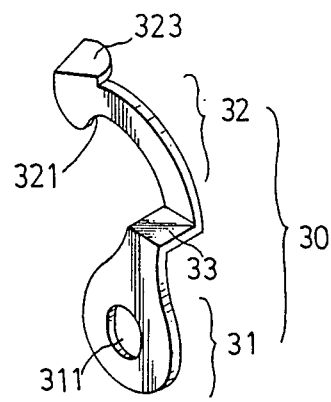
FIG. 1 is a perspective view of a safety mounting device for a bicycle quick-release hub according to the invention.
Figure 2:
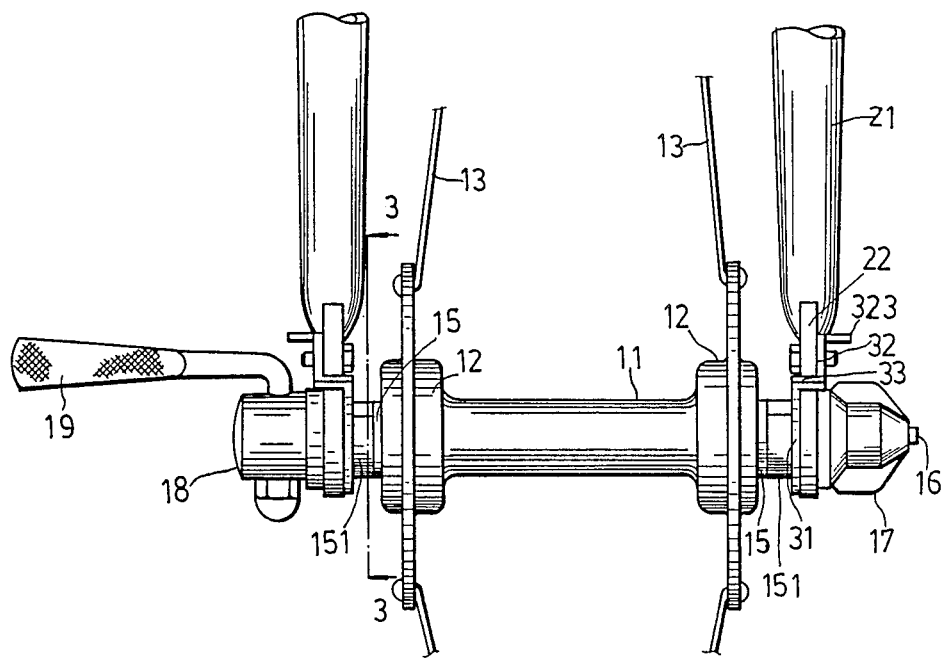
FIG. 2 is a front elevational view of a quick-release hub mounted in the lower ends of a bicycle front fork and incorporating the safety mounting device of FIG. 1.
Figure 3:
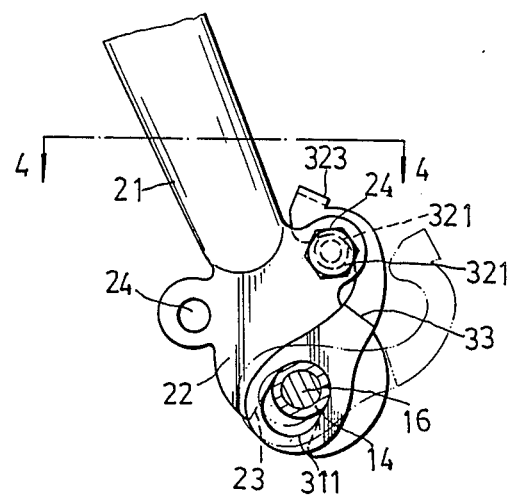
FIG. 3 is a vertical section taken substantially on the line 3—3 of FIG. 2.
Figure 4:
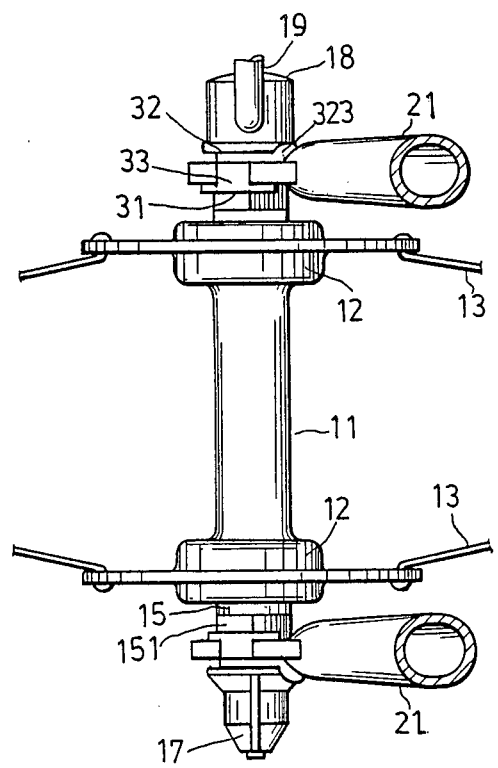
FIG. 4 is a horizontal section taken substantially on the line 4—4 of FIG. 3.

The invention is shown in the drawings as comprising a safety mounting for quick-release hubs. The example of the latter is the same as that illustrated and described in detail in U.S. Pat. No. 3,807,761. This quick-release hub is designated generally by reference numeral 11 and includes a shell with end cups 12 and supporting and having attached thereto the usual spokes 13, and a hollow axle 14, as best seen in FIG. 3. The end cups 12 are rotatably supported on the axle 14 and the bearing adjacent each end of the latter in well known manner and retained thereon by lock washers 15 (see FIG. 2) and locking or retaining nuts 151. As is well understood in the art, a quick-release unit is incorporated in the hub 11 in the form of a mounting stud 16 extending axially through the hollow axle 14 and having adjustable retainer members on its ends comprising a nut 17 (see FIG. 2) and an eccentric 18 movable relative to the stud 16 longitudinally thereof by a manually operable lever 19.

The drawings illustrate only the lower portions of a pair of legs 21 of the front fork of a bicycle, each having a plated lower end piece 22 mounted therein and depending therefrom in well known manner. As will be understood by one skilled in the art, these legs may be forged or tubular (as shown herein) and the end pieces 22 are each provided with the usual axle-receiving open-ended slot 23 (see FIG. 3). The axle 14 of the quick-release hub 11 is illustrated as being seated in the upper ends of these slots 23 with the fork end piece 22 disposed between the lock nuts 151 and their associated adjustable retainer members 17, 18. As also is well known, following upward movement of the wheel and its hub 11 to so engage the axle 14 in the slots 23, actuation of the manually operable lever 19 will draw the two retaining members 17, 18 together or toward each other to clampingly engage against the outer surfaces of the respective fork arm end pieces 22.

The invention provides an improved axle-retaining means over the U.S. Pat. No. 4,103,922. The preferred embodiment herein comprising a clip indicated generally by reference numeral 30 mounted adjacent each end of the quick-release hub 11 between the associated lock washers 15 and retaining nuts 151. To this end, each clip 30 is rigid and comprises integrally formed a lower arm 31 having an aperture 311 therin, a curved upper arm 32 extending parallel to the lower arm 31 and having a downwardly recurved free end forming a downwardly opening curve 321, and a middle portion 33 interconnecting the lower end of the upper arm 32 and the upper end of the lower arm 31 at right angle. Further provided on the free end of the upper arm 32 of the clip 30 is a knob 323 for convenience in operation. The lower arm 31, the upper arm 32, and the middle portions 33 of the clip 30 are plated.

Similarly, in the embodiment, the fork end piece 22 is plated (see FIG. 3). It has a curved edge and a pair of tap holes 24 above the slot 23. Furthermore, the length of the middle portion 33 of the clip 30 is slightly larger than the thickness of the fork end piece 22 so as to enable the upper and lower arms 31, 32 to slide smoothly and to abut smoothly on the opposite surfaces of the fork end piece 22.

Referring to FIG. 3, in the mounting of the quick-release hub 11, incorporating the clip 30, in the front fork of a bicycle, a cap screw 322 is screwed into the tap hole 24 of the fork end piece 22 so as to permit a portion of the cap screw 322 to protrude from the outward surface of the fork end piece 22. Then, the clip 30 is disposed in the broken line position as the fork end piece 22 are moved into seating engagement with the axle 14 disposed in the open-ended slot 23. In this position, the upper and lower arms 31, 32 of the clip 30 are disposed radially of the axle 14, and the bridging portion 33 of the clip 30 is disposed parallel to the longitudinal axis of the axle 14. Subsequently, the clip 30 is rotated from the broken line position to the solid line position where the recurved free end of the upper arm 32 hooks over the protruding portion of the cap screw 322. This allows the axle 14 to be hung on the fork end piece 22 without risking separation of the axle 14 from the front fork.

It should be noted that the abutting of the upper and lower arms 31, 32 on the surfaces of the fork end piece 22, especially the abutting of the upper arm 32 on the outward surfaces of the fork end piece 22, will prevent accidental separation of the hub 11 from the front fork despite release of the adjustable retainer members 17 and 18.

With the invention thus explained, it is apparent that various modifications and variations can be made without departing from the scope of the invention. It is therefore intended that the invention be limited as indicated in the appended claims.

What is claimed is:

1. An improved safety mounting device for a bicycle quick-release hub having a wheel axle engageable in open-ended slots in the lower end portions of the legs of the front fork of the bicycle for receiving said axle, and a quick-release unit including adjustable retainer members movable relative to said axle longitudinally thereof for clampingly retaining said axle in said slots; each of said legs including a protrusion on an outward surface thereof above said slot, said safety mounting device comprising a pair of rigid clips, wherein each of said clips comprises:

a lower end pivotally mounted on said axle; and
    parallel upper and lower portions extending radially of said axle, said upper portion having a curved free end for hooking over said protrusion to mount said axle on said legs of said front fork and being offset from said lower portion in an axial direction of said axle and being spaced in said axial direction from said lower portion at a distance slightly larger than the thickness of the lower end portion of said leg engaged therewith such that when said free end is hooked over said protrusion, said upper and lower portions of said clip respectively abut opposite sides of said lower end portion of said leg to prevent accidental separation of said hub from said front fork despite release of said adjustable retainer members.

2. An improved safety mounting device as claimed in claim 1, wherein each of said clips has an aperture for receiving said axle.

3. An improved safety mounting device as claimed in claim 1, wherein each of said clips includes a knob on said curved free end thereof for the purpose of convenient operation.

4. An improved safety mounting device as claimed in claim 1, wherein said lower end portions of said legs are plated, and wherein said upper and lower portions of said clips are plated for smoothly abutting and smoothly sliding on said plated portions of said legs.

5. An improved safety mounting device as claimed in claim 1, further comprising a pair of cap screws, and wherein each of said legs has a tap hole above said slot for receiving one of said cap screws to permit a portion of said cap screw to protrude from said outward surface of said leg, thereby forming a detachable said protrusion.

* * * * *